United States Patent

Harshbarger et al.

(10) Patent No.: US 7,895,767 B2
(45) Date of Patent: Mar. 1, 2011

(54) ELECTRONIC DEPTH GAUGE WITH VARIABLE ELECTRICAL RESISTANCE SENSING

(75) Inventors: Michael Harshbarger, Lake Villa, IL (US); John Y. S. Kim, Chicago, IL (US); Mu-Jen Wang, Tucheng (TW); Wen-Ta Chang, Shalu Township (TW)

(73) Assignee: Eidosmed LLC, Chicago, IL (US)

( * ) Notice: Subject to any disclaimer, the term of this patent is extended or adjusted under 35 U.S.C. 154(b) by 0 days.

(21) Appl. No.: 12/558,804

(22) Filed: Sep. 14, 2009

(65) Prior Publication Data

US 2010/0154238 A1    Jun. 24, 2010

Related U.S. Application Data

(60) Provisional application No. 61/096,524, filed on Sep. 12, 2008.

(51) Int. Cl.
G01B 7/26    (2006.01)
A61B 5/103   (2006.01)

(52) U.S. Cl. ............................. 33/836; 33/512; 600/587
(58) Field of Classification Search .................. 33/512, 33/832, 833, 836
See application file for complete search history.

(56) References Cited

U.S. PATENT DOCUMENTS

| | | | |
|---|---|---|---|
| 1,526,418 | A | 2/1925 | Gronner |
| 2,920,395 | A | 1/1960 | Germann |
| 3,916,529 | A | 11/1975 | Mousseau |
| 3,943,914 | A | 3/1976 | Grenfell et al. |
| 4,005,527 | A | 2/1977 | Wilson et al. |
| 4,016,867 | A * | 4/1977 | King et al. ................... 33/512 |
| 4,033,043 | A | 7/1977 | Cunningham |
| 4,224,951 | A | 9/1980 | Hasson |

(Continued)

FOREIGN PATENT DOCUMENTS

WO    WO 99/26414 A1    5/1999

(Continued)

OTHER PUBLICATIONS

Cannon Calculator TS82H Handheld-Execuline Business Systems, published on internet website: http://shop2.mailordercentral.com/execuline/prodinfo.asp?number=CA-CN-4050A003BA (Mar. 27, 2009).

(Continued)

*Primary Examiner*—G. Bradley Bennett
(74) *Attorney, Agent, or Firm*—Drinker Biddle & Reath LLP

(57) ABSTRACT

A digital depth gauge apparatus is provided for measuring a depth of a hole in, or surface of, an object using a variable-resistance sensor. The apparatus comprises an elongated reader body that includes a distal end and a proximal end having a longitudinal axis and a user interface including a display and at least one actuator that controls operation of at least one of the display and the apparatus. The apparatus includes a probe that extends from the distal end of the reader body, the probe including a tip for locating a distal surface of the object. The reader body proximal end is configured to abut an other surface of the object. An electrical resistance-based sensor is provided to determine an extension distance of the probe from the body.

17 Claims, 6 Drawing Sheets

U.S. PATENT DOCUMENTS

| | | | |
|---|---|---|---|
| 4,432,376 A | 2/1984 | Huszar | |
| 4,708,647 A | 11/1987 | Pippin et al. | |
| 4,718,850 A | 1/1988 | Knebelman | |
| 4,845,646 A | 7/1989 | Marquis et al. | |
| 5,013,318 A | 5/1991 | Spranza, III | |
| 5,056,238 A | 10/1991 | Chi | |
| 5,212,871 A | 5/1993 | Luccarelli | |
| 5,490,335 A | 2/1996 | Chu | |
| 5,548,903 A | 8/1996 | Johnson et al. | |
| 5,592,224 A | 1/1997 | Shim | |
| 5,796,088 A | 8/1998 | Wall | |
| 5,801,761 A | 9/1998 | Tibor | |
| 5,801,762 A | 9/1998 | Dianna et al. | |
| 5,873,175 A | 2/1999 | Johnston | |
| 5,973,915 A | 10/1999 | Evans | |
| 5,979,764 A | 11/1999 | Swyst et al. | |
| 5,986,222 A | 11/1999 | Helberg | |
| 6,043,438 A | 3/2000 | Helberg | |
| 6,145,509 A | 11/2000 | Tanner | |
| 6,248,017 B1 | 6/2001 | Roach | |
| 6,279,248 B1 | 8/2001 | Walters | |
| 6,494,848 B1 | 12/2002 | Sommercorn et al. | |
| 6,508,012 B2 | 1/2003 | Wells, Jr. | |
| 6,665,948 B1 | 12/2003 | Kozin et al. | |
| 6,811,557 B2 | 11/2004 | Schraga | |
| 6,827,581 B2 | 12/2004 | Ho et al. | |
| 6,990,746 B2 | 1/2006 | Penna et al. | |
| 7,025,774 B2 | 4/2006 | Freeman et al. | |
| D520,889 S | 5/2006 | Kesselman | |
| 7,065,208 B2 | 6/2006 | Tsubai et al. | |
| 7,076,886 B2 | 7/2006 | John et al. | |
| 7,095,302 B2 | 8/2006 | Puskar et al. | |
| 7,165,336 B2 | 1/2007 | Kim | |
| 7,222,544 B1 | 5/2007 | Jenkins | |
| 7,444,756 B2 | 11/2008 | Kim | |
| 7,469,602 B2 | 12/2008 | Gharib et al. | |
| 2003/0047009 A1 | 3/2003 | Webb | |
| 2003/0088991 A1 | 5/2003 | Fullerton | |
| 2005/0059883 A1* | 3/2005 | Peterson | 600/587 |
| 2005/0066535 A1 | 3/2005 | Rupp et al. | |
| 2006/0041241 A1 | 2/2006 | Herndon | |
| 2006/0207119 A1 | 9/2006 | Kim et al. | |
| 2006/0224161 A1 | 10/2006 | Bhattacharyya | |
| 2006/0240873 A1 | 10/2006 | You et al. | |
| 2007/0142750 A1* | 6/2007 | Kotmel et al. | 600/587 |
| 2010/0137874 A1* | 6/2010 | Kim et al. | 33/836 |

FOREIGN PATENT DOCUMENTS

| | | |
|---|---|---|
| WO | WO 00/78258 A1 | 12/2000 |
| WO | WO 2005/027745 A1 | 3/2005 |

OTHER PUBLICATIONS

EURACLI: la microencapsulation en cosmetology, oenologie, imprimerie, textile . . . , Microcapsules for Wine Bottles, published on internet website: http://www.packline-france.com/euracli/uk/dO5.htm (Mar. 27, 2009).

Temperature measurement, Automation, Process Engineering, Laboratory Equipment; Temperature measurement, published on internet website: http://www.sysmatec.ch/eD7_Temperature_Measurement.html (Mar. 27, 2009).

* cited by examiner

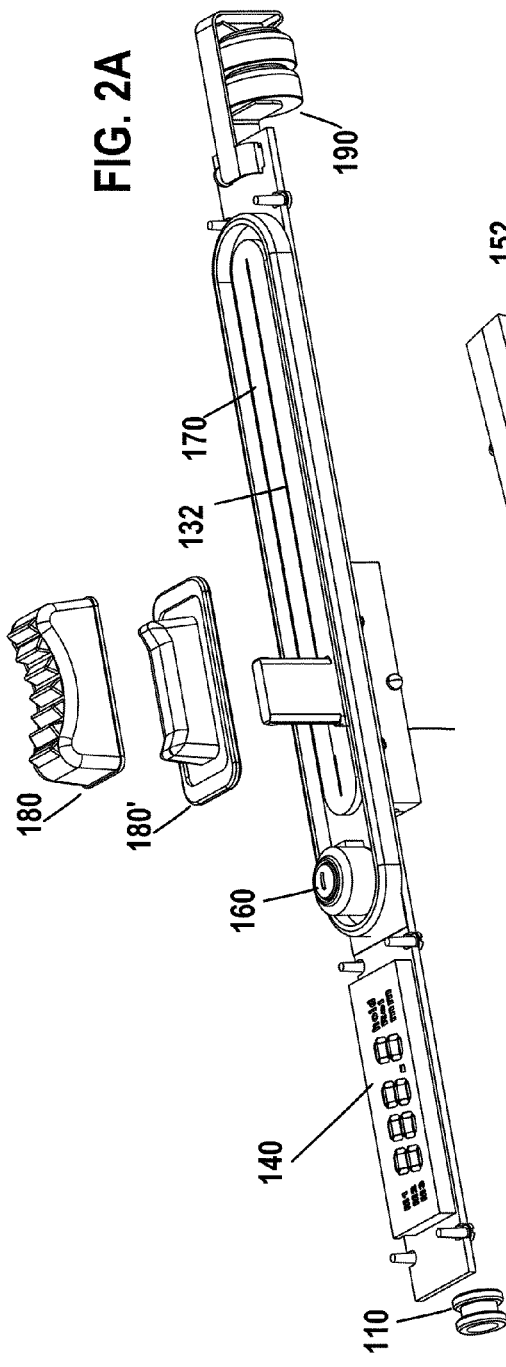
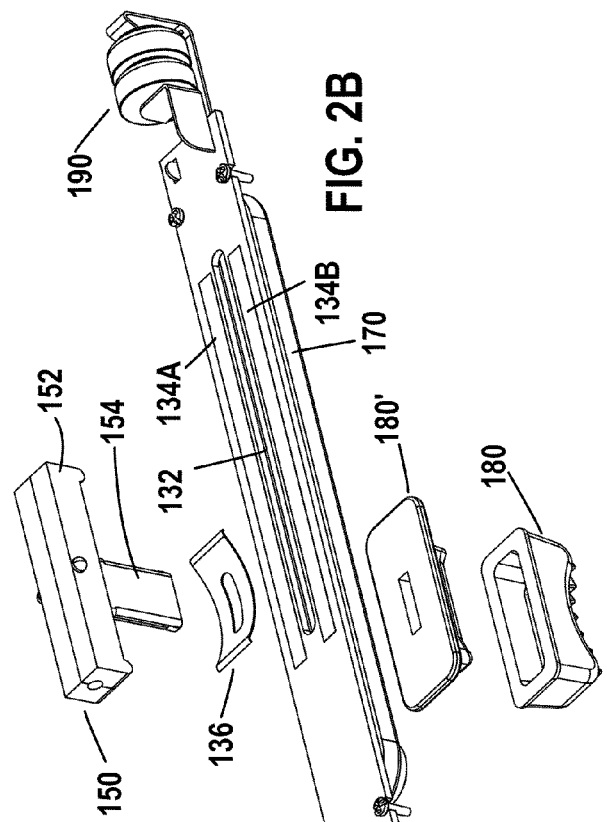
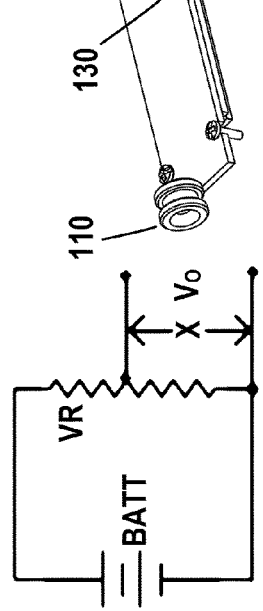

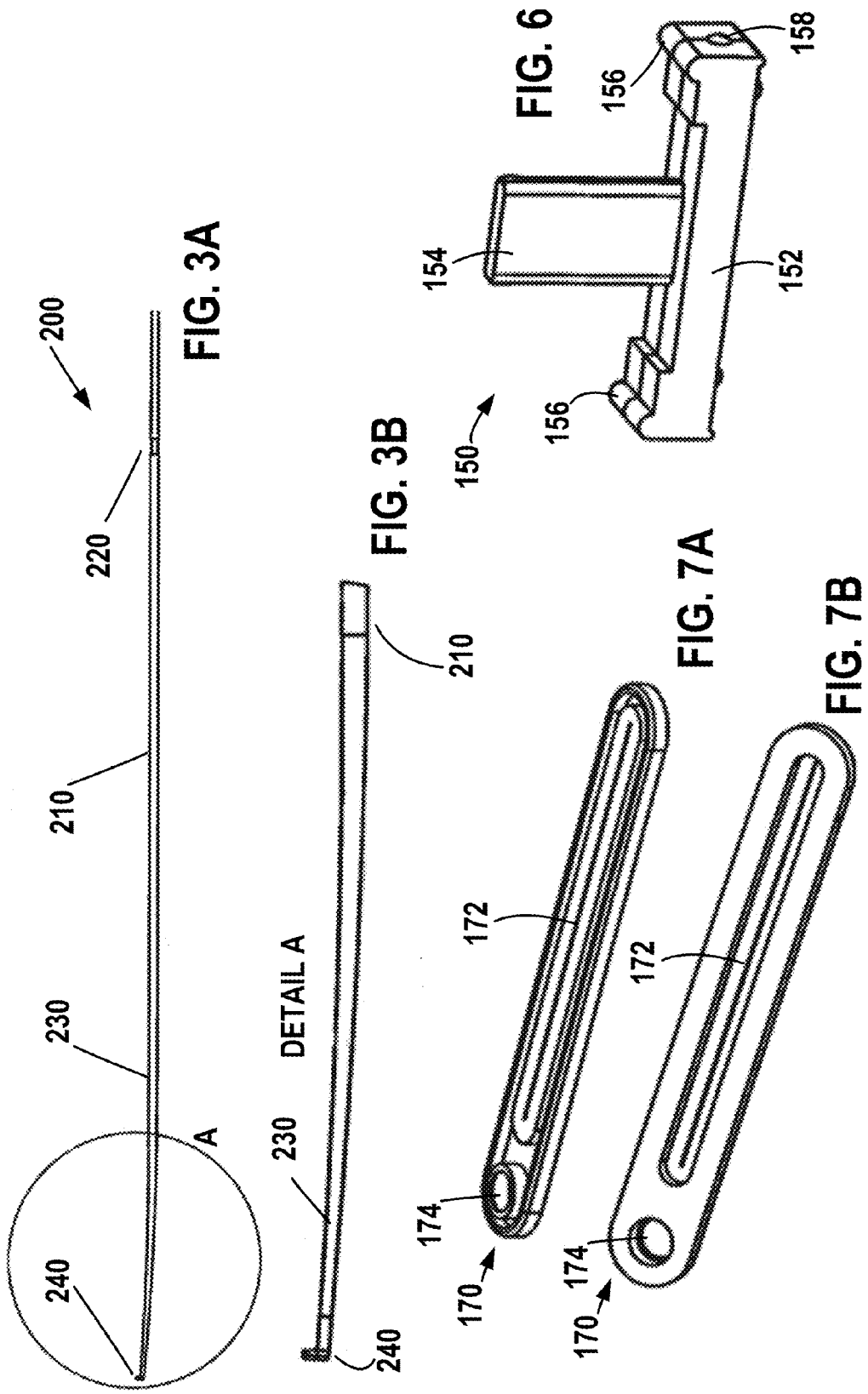

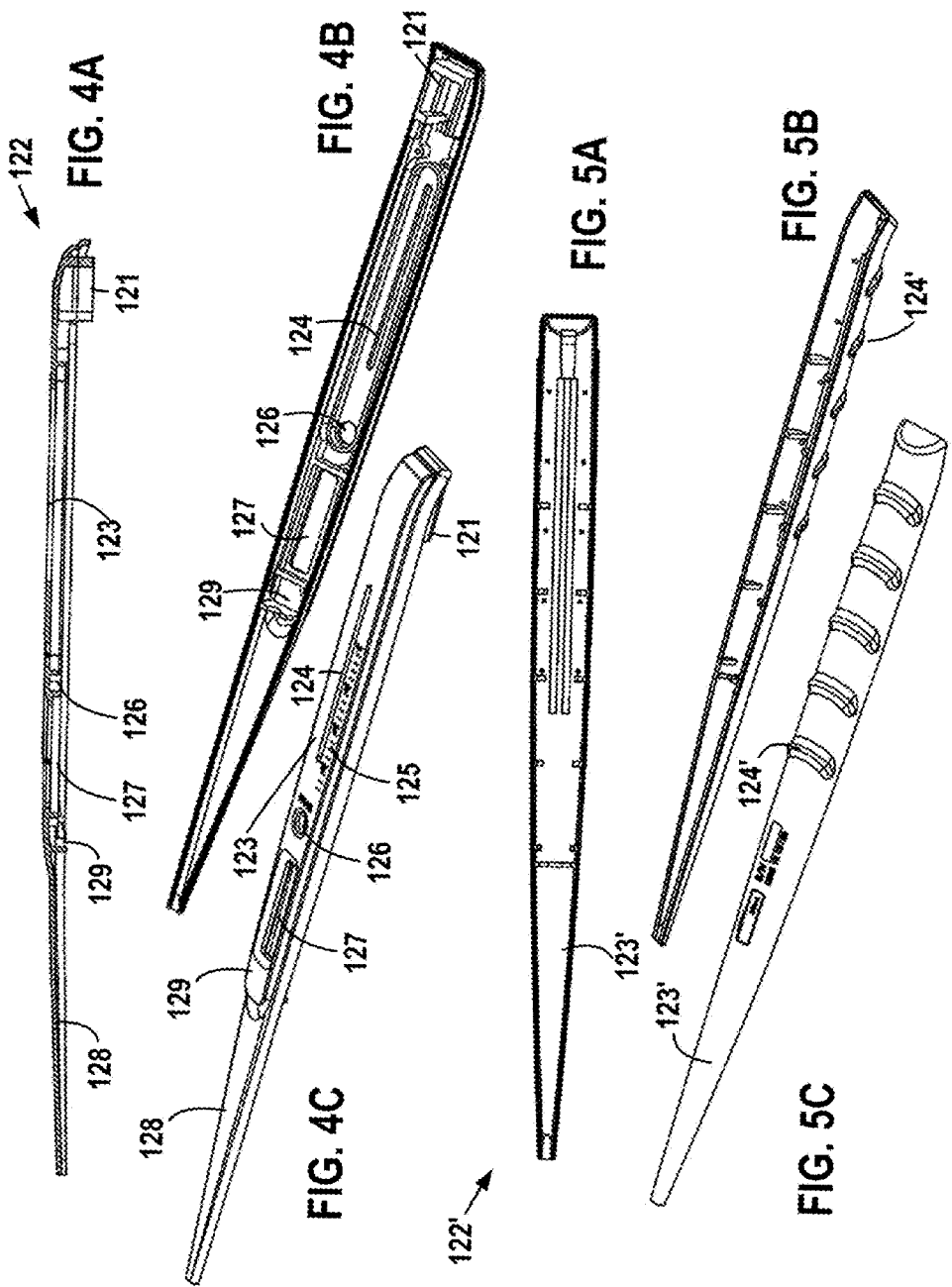

ELECTRONIC DEPTH GAUGE WITH VARIABLE ELECTRICAL RESISTANCE SENSING

CROSS REFERENCE TO RELATED APPLICATIONS

The present application claims the benefit of U.S. Provisional Application No. 61/096,524, filed Sep. 12, 2008, entitled, "ELECTRONIC DEPTH GAUGE WITH VARIABLE ELECTRICAL RESISTANCE SENSING", herein incorporated by reference.

The present application also contains subject matter related to U.S. patent application Ser. No. 12/391,814, filed Feb. 24, 2009, U.S. patent application Ser. No. 11/376,399, filed Mar. 15, 2006, and U.S. Pat. No. 7,165,336, the entire content of these being herein incorporated by reference.

BACKGROUND

The present invention relates generally to measuring instruments. More particularly, the invention pertains to an apparatus for determining a distance relative to changes in a variable electrical resistance, and an electronic depth gauge including the apparatus.

Various measuring devices are known for determining the distance between two points. Such measuring devices employ a variety of mechanical, electromechanical, and/or electrical/electronic techniques for sensing or determining relative or absolute distances. For example, gauges with graduated scales, magnetic or optical encoders, ultrasonic, infrared, and capacitive or inductive measuring devices are all known. However, an electronic depth gauge as described herein using a variable electrical resistance to measure distance would be advantageous.

SUMMARY

Accordingly, a digital depth gauge apparatus is provided for measuring a depth of a hole in, or surface of, an object, the apparatus comprising: an elongated reader body that includes a distal end and a proximal end having a longitudinal axis; a user interface including a display and at least one actuator that controls operation of at least one of the display and the apparatus; a probe that extends from the distal end of the reader body, the probe including a tip for locating a distal surface of the object; the reader body proximal end configured to abut another surface of the object; and an electrical resistance-based sensor fixedly positioned relative to at least one of: a) the reader body, and b) the probe, and movably positioned relative to, respectively, at least one of: b) the probe, and a) the reader body, the sensor comprising an interface to the user interface display and having an output indicating a relative distance between the probe tip and the proximal end of the reader body.

The apparatus may further comprise a slider element that is one of actuators, the slider element being attached to the probe and movable in a direction parallel to the longitudinal axis of the body; wherein the sensor comprises a linear variable resistor element and a conducting element that contacts the linear variable resistor element at some point along its length, the slider element being fixedly attached to at least one of the conducting element and the linear variable resistor element to effect relevant motion between the two as the slider is moved; the apparatus further comprising: a power source attached across the variable resistor element at a fixed voltage or current; and circuitry to measure voltage or current within the variable resistor element that is related to a position of the conducting element along the linear variable resistor element; and circuitry to convert and display the variable resistor element voltage or current as a distance related to a distance between the probe tip and the proximal end of the reader body.

The variable resistor element may comprise two parallel resistive strips arranged on the circuit board. The slider element may comprise: a base portion; and a coupling portion, the coupling portion holding the conducting element so that the conducting element creates an electrical contact between the two parallel resistive strips at a particular location. The coupling portion may protrude through a slit on the printed circuit board. The resistive strips may comprise a series of discrete bands, each having a predetermined resistance.

The body may be a sealed body, and the sealed body may comprise: a first seal that is located at the proximal end of the body and seals a location of the body through which the probe extends; and a second seal that is located along a slider opening and seals a location of the body through which the slider extends. The first seal may be a generally disk-shaped seal, and the second seal may be a seal extending longitudinally along the body between the body case and the printed circuit board, and comprises a slit through which a portion of the slider extends.

The apparatus may be holdable and operable with a single hand, and the total length of the body may be between 150 mm and 250 mm. The apparatus may further comprise an ergonomic treatment located on an exterior surface of the body, and the ergonomic treatment may be formed from a thermoplastic elastomer. The apparatus may be self-contained and comprises its own power source.

Advantages of variable resistance technology include increased accuracy and durability in the surgical field by mitigating interference caused by the presence of fluid and soft tissue. The technology is cost effective when used as a single use device and unlike optical, magnetic, infrared, conductive, inductive, or ultrasonic devices, there is no interference with other technology present in the surgical suite. The use of variable resistance technology permits development of a very small and ergonomically advantageous device for users in an environment such as the operating room.

The biggest advantages of VR technology is the size particularly as it relates to inductive technology. Specifically VR technology allows us to create a small ergonomically advantageous device necessary for success in the operating room. Optical, ultrasonic, and infrared technologies are as accurate, but have more difficulty in such an implementation due to the impedance caused by the body as well as other machinery in the operating room; importantly, such devices are also very expensive to use when a disposable device is desired.

BRIEF DESCRIPTION OF THE DRAWINGS

The following describes the drawings that illustrate various embodiments of the invention.

FIG. 2A is a partially-exploded top perspective view of internal components of the electronic depth gauge of FIG. 1;

FIG. 2B is a partially-exploded bottom perspective view of internal components of the electronic depth gauge of FIG. 1;

FIG. 2C is a simplified circuit diagram illustrating the variable resistor component;

FIG. 3A is a side view of an exemplary probe of the electronic depth gauge of FIG. 1;

FIG. 3B is a side detail view of the tip portion of the probe shown in FIG. 3A;

FIG. 4A is a side view of an exemplary top housing portion of the electronic depth gauge of FIG. 1;

FIG. 4B is a bottom perspective view of the top housing portion of the electronic depth gauge of FIG. 1;

FIG. 4C is a top perspective view of the top housing portion of the electronic depth gauge of FIG. 1;

FIG. 5A is a top view of the bottom housing portion of the electronic depth gage of FIG. 1;

FIG. 5B is a top perspective view of the bottom housing portion of the electronic depth gage of FIG. 1;

FIG. 5C is a bottom perspective view of the bottom housing portion of the electronic depth gage of FIG. 1;

FIG. 6 is a perspective view of an exemplary sliding carriage of the electronic depth gauge of FIG. 1;

FIGS. 7A-B are top and bottom perspective views of an exemplary seal of the electronic depth gauge of FIG. 1;

DETAILED DESCRIPTION OF THE EMBODIMENTS

The following discusses various embodiments of the invention. The Figures illustrate embodiments of a variable electrical resistance apparatus for measuring a distance, and an electronic depth gauge including the same are provided.

Figure 1A:
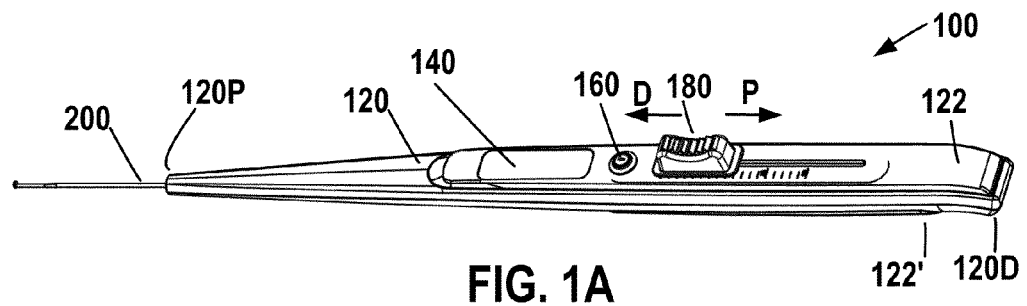
FIG. 1A is a perspective view of an embodiment of an electronic depth gauge.
Figure 1B:
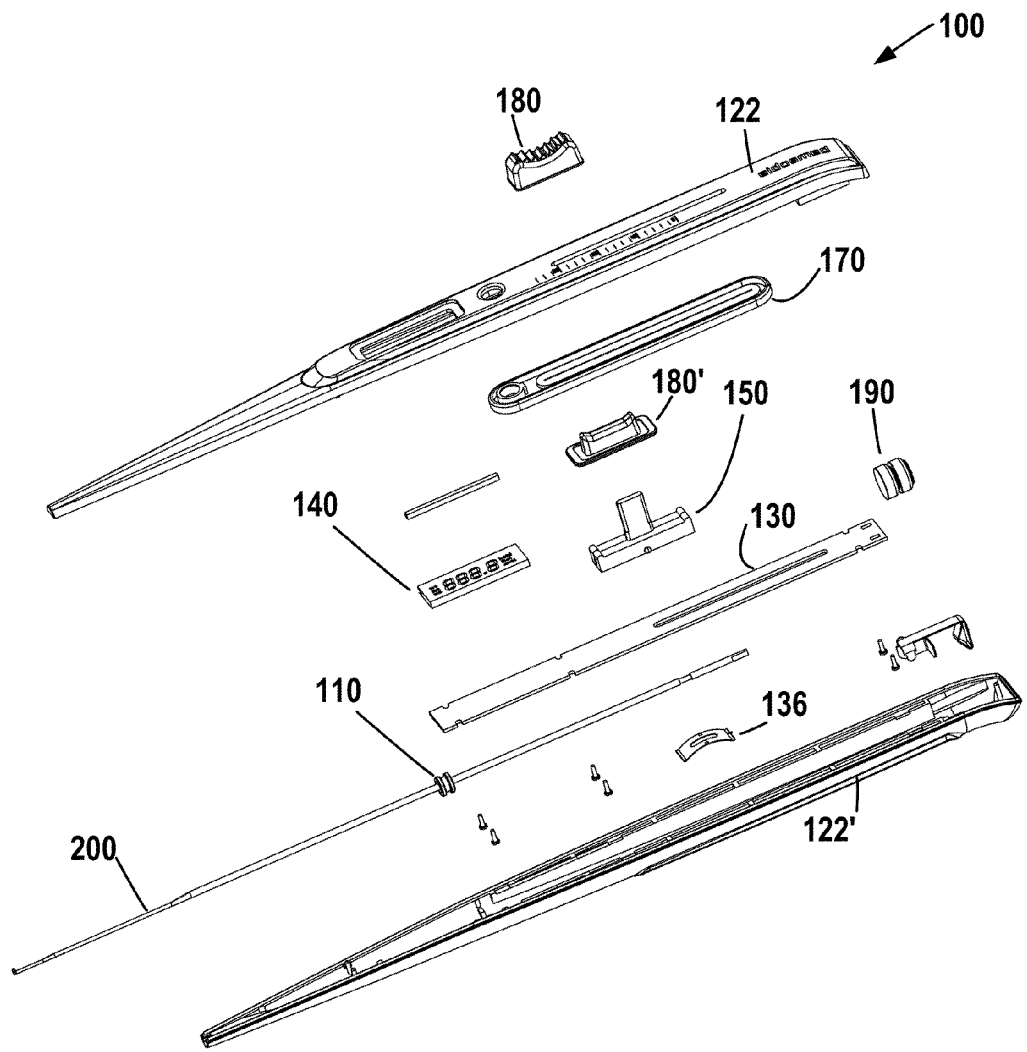
FIG. 1B is a partially-exploded perspective view of the electronic depth gauge of FIG. 1.

Referring to FIG. 1A, an exemplary electronic depth gauge 100 is shown. The gauge 100 includes a generally elongated housing 120, an electronic display 140 and one or more actuators (e.g., an on/off/measurement-hold button 160 and a slider 180 as shown). As shown in FIG. 1B, the gauge 100 further includes a probe 200 that telescopes into and out from the housing to measure a distance between two points. FIG. 1B further shows that housing 120 may be formed of two complementary-formed parts 122, 122' that may be mated, engaged, connected or otherwise coupled together (e.g., snap-fit, glued, welded, fastened using screws, etc.).

Although the gauge 100 may be used in the context of measuring the depth or length of a hole in a bone (e.g., during an orthopedic, oral maxillofacial, etc. surgery), it should be appreciated that the gauge 100 may be used for various applications where it is desired to measure a distance between two points.

In one exemplary use of the illustrated gauge 100, a surgeon drills a hole (e.g., a pilot hole) in a bone and inserts the gauge 100 into the surgical field to measure the depth of the hole for selecting a fastener (e.g., screw, bolt, pin, wire, etc.) that will be inserted into the hole to fasten bones or pieces of bones together. Once a distal end of the gauge 100 is placed or aligned with the hole, the user (e.g., the surgeon) then moves the slider 180 distally (as indicated in FIG. 1A by arrow "D") to extend the probe 200 (shown in FIGS. 1B and 3A-B) through the hole.

After the surgeon determines that the probe 200 has exited a distal end of the hole, the surgeon moves the slider 180 proximally (as indicated in FIG. 1A by arrow "P") so that an engagement surface (e.g., barb, catch, etc.) at the distal end of the probe 200 may find purchase on the distal surface of the bone. The surgeon may move the slider 180 further in the proximal direction after the probe 200 has achieved purchase so that the distal end of the housing 120 rests against the proximal surface of the bone. In this way, a depth of the hole is measured or otherwise determined according to a length of the probe that is extended or projected from the distal end of the housing 120. The length is then displayed on display 140. The surgeon may press the on/off/hold button 160 to freeze the display 140 and/or store the displayed value in a memory for recall after the gauge 100 has been removed from the surgical field. The gage could also be used where the hole is not a through-hole, and thus the gauge could serve to operate as a simple depth gage with the tip end contacting a bottom surface of the hole.

Referring now to FIGS. 2A and 2B, various internal components of the example electronic depth gauge 100 shown in FIG. 1 are described. As shown in FIG. 2A, the gauge 100 includes a first seal 110, a circuit board 130, a carriage 150, a second seal 170, and a power source 190. The seals are preferably made of biocompatible rubber polymers. The first seal 110 is configured at the distal end of the housing. The first seal 110 is generally annular or toroidal in shape so that the gauge's probe 200 (FIG. 1B) can extend or otherwise project through the first seal 110 while preventing intrusion of contaminants (e.g., liquid such as bodily fluid, or solids such as dust, dirt, etc.) into the housing 120. The housing 120 is preferably of a length that makes it holdable and operable with one hand, e.g., in a range of 150-250 mm, however, other lengths could clearly be used.

Figure 9A:
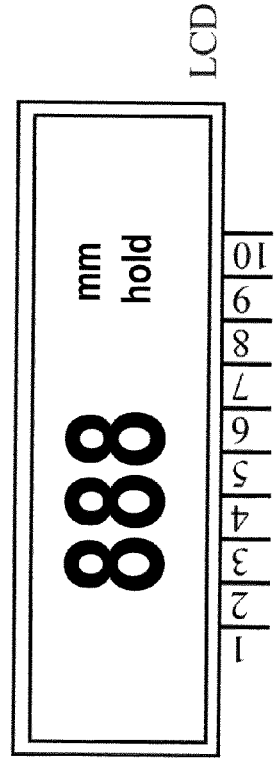
FIGS. 9A-B are parts of an exemplary electrical circuit schematic of the electronic depth gauge of FIG. 1.

The gauge 100 further includes a circuit board 130 to which components of the gauge 100 are electrically and/or physically coupled. The circuit board 130 may be a printed circuit board, that is, a rigid substrate with conductive traces on one or both sides thereof. As shown, the circuit board 130 is generally elongated along a longitudinal axis defining a center of the gauge 100, and the display 140 is mounted to a distal end of the circuit board 130. Although the display 140 illustrated in FIGS. 1A-2B shows numeric digits, it should be appreciated that the display 140 may be configured otherwise to show, for example fewer or additional indicia (e.g., alphanumeric characters), symbols, etc. As shown in FIG. 9A, one embodiment of the display may be configured to show three alphanumeric characters.

As can be appreciated from FIGS. 2A and 2B, the carriage 150 couples with the slider 180 so that the carriage 150 may be moved proximally and distally by the user along a portion of the circuit board 130, particularly the slot 132 shown in FIGS. 2A, 2B. As will be discussed in further detail hereinafter with reference to FIG. 6, the carriage 150 includes a base portion 152 and a coupling portion 154. The base portion 152 of the carriage 150 is configured on a bottom surface of the circuit board 130, and the coupling portion 154 extends upward from the base portion 152 and through the slot 132 in the circuit board 130 to couple with the slider 180 for moving the base portion 152 along the semiconductive trace or traces 134A, B. As shown in FIG. 2B, a conductive member 136 is configured on the coupling portion 154 of the carriage 150 between the base portion of the carriage 150 and the bottom surface of the circuit board 130 for contacting and bridging across the semiconductive traces 134A, B (FIG. 2B). By moving the conductive member 136 along the traces, a different effective length through which electrical current flows is achieved, which can then be accurately measured as a current (for a constant voltage source), or as a voltage (for a constant current source).

FIG. 2C illustrates a simplified circuit diagram of the variable resistor VR, where X represents the distance of movement, with $V_O$ being the voltage. As the distance X increases, so will $V_O$, and, based on a software calibration, this circuit creates a measurement value based on a minimum and maximum value that is calibrated into the software.

In the preferred embodiment, the conductive member 136 is isolated, i.e., not attached to any other point of the circuit except where it creates a conductive path between the two semiconductive traces 134A, B. However, it is also possible to provide an electrical connection (e.g., a flexible wire or thin cable) between the conductive member 136 and other parts of the circuitry as well.

The semiconductive traces 134A, B may be formed from carbon, carbon compound, or other suitable semiconductor material, and the traces 134A, B may be configured as continuous members or as a series of discrete bands (e.g., each band having a predetermined resistance). Furthermore, linear (preferable) or logarithmic tapers could be used. These semiconductive traces 134A, B are joined by conductive traces 138 located on either side. When carbon printing on a PCB is used, a line accuracy for the gage is approximately 1%, and the display 140 may be configured to display to an accuracy of, e.g., 0.1 mm. To achieve accurate carbon placement, in order to place the carbon traces on the PCB, a specialized printer may be used that deposits the material in a linear manner along the length of the board.

Calibration may be mediated by the variable resistance tracing artwork relative to the PCB artwork. Both pieces of information may be scanned into the printing software which then uses a microprocessor to align the two images to ensure printing occurs along the predetermined pathway. Then, the device software is loaded onto the microprocessor which subsequently sets a zero point for the carbon traces and a maximal point by extending the probe relative to precise gauge blocks. This is performed by the gauge manufacturer and follows a software standard operating procedure, ensure accuracy.

As can be appreciated, the conductive member 136 and semiconductive traces 134A, 134B define a linear potentiometer with the conductive member 136 functioning as the wiper for varying or changing a resistance relative to a position of the conductive member 136 (and a position of the slider 180) along the length of the traces 134A, 134B. Since the probe 200 moves relative to the slider 180, a distance that the probe 200 is extended from the housing 120 can be determined based on the resistance of the linear potentiometer—for example, according to a measured voltage (resulting from a constant current flowing though the variable resistance), or a measured current (resulting from a constant voltage across the variable resistance).

In an alternate embodiment, the semiconductive traces could also be associated/affixed to structure associated with the probe 200, with the conductive member being affixed at some point on the PCB 130, so that movement of the probe 200 still results in relative motion between the semiconductive traces and the conductive member serving as a center tap, wiper, or electrical conductor for the potentiometer.

As shown in FIG. 2A, the second seal 170 is configured with a longitudinal slot or aperture therein which corresponds to a longitudinal slot 132 (FIG. 2B) or aperture in the circuit board 130. The second seal 170 is configured on the top surface of the circuit board 130 such that the coupling portion of the carriage 150 extends through the second seal 170 to couple with the slider 180. The second seal 180 is configured to prevent intrusion of contaminants (e.g., liquid such as bodily fluid, or solids such as dust, dirt, etc.) into the housing 120 through one or more apertures thereof (e.g., a first aperture defined in the housing 120 through which button 160 extends, and an elongated aperture or slot defined in the housing 120 and along which the slider 180 moves).

As further shown in FIGS. 2A and 2B, the power source 190 may be one or more disposable or rechargeable batteries, which may be permanently installed or removable/replaceable. Alternatively, the gauge 100 may include a jack, interface, or cord to connect the gauge 100 to a source of power such as a typical 120/240 volt AC receptacle.

Referring now to FIGS. 3A, B, an exemplary probe for the gauge 100 is described. As shown, the exemplary probe 200 includes a central portion 210, a proximal portion 220 and a distal portion 230 with an engagement surface 240. FIG. 3A illustrates a side elevation view of the exemplary probe 200, and FIG. 3B is a detail view of the distal end and probe tip 240.

As shown, the distal portion 230 may have a diameter that tapers or otherwise decreases from the central portion 210 toward the engagement surface 240. As can be appreciated from FIG. 3B, the distal portion 230 may be curved or angled relative to the central portion 210. Preferably, the probe 200 has a length that permits it to be fully retracted into the body 120. In an exemplary embodiment in which the body is between 150 mm and 250 mm in length, then the probe would have just a slightly shorter length to fit within the body. Although various dimensions have been discussed for the illustrated example probe, indeed, the probe may be configured otherwise. The probe 200 may be designed to protrude somewhat even in a fully retracted position. The probe may be completely straight (i.e., the distal portion 230 being coaxial and coextensive with the central portion 210) instead of including a curved portion.

Referring now to FIGS. 4A-C, a top portion of the housing 120 (FIG. 1) is described. Although various configurations are shown for the illustrated top housing portion, it may be configured otherwise. FIG. 4A is a side view of the top housing portion 122. FIG. 4B is an interior perspective view of the top housing portion 122. FIG. 4C is an exterior perspective view of the top housing portion 122.

As shown in FIGS. 4A-C, hereinafter collectively referred to as FIG. 4, the top housing portion 122 includes a first portion 123 and a second portion 128. The first portion 123 is generally rectangular in shape for retaining the circuit board 130 (FIGS. 2A-B) and other internal components of the gauge 100. As shown, first portion 123 includes a first aperture 124, a second aperture 126 and a third aperture 127. The first aperture 124 is configured as a generally elongated slot or slit in the top housing portion 122 so that the coupling portion of carriage 150 (FIGS. 2A-B) can extend therethrough and move laterally therealong. The second aperture 126 is configured as a generally circular hole through which the button 160 extends. The third aperture 127 is configured as a generally rectangular window for viewing the display 140 (FIGS. 1A and 2A).

As shown in FIG. 4, the first portion 123 may include or bear thereon a graduated scale 125 configured alongside the first aperture 124. Although the graduated scale 125 is shown relative to the gauge 100, other embodiments of the gauge need not include a graduated scale. A user of the gauge 100 may read a point on the graduated scale 125 corresponding to a center (e.g., a center ridge) of the slider 180 (FIGS. 1A and 2A) to determine (or independently verify/double-check the value being displayed on the display 140) a depth or length of an object that is being measured. The graduated scale 125 may be configured in one or more units of measurement, for example English and/or metric units.

As shown in FIG. 4, the first portion 123 may include a first chamber 121 and a second chamber 129. As shown, the first chamber 121 is configured at a proximal end of the first portion 123 for retaining the power source 190 (FIGS. 2A-B).

The second chamber 129 is configured at a distal end of the first portion 123 for retaining the first seal 110 (FIGS. 2A-B). The probe 200 (FIGS. 3A-B) extends from the carriage 150 (FIGS. 2A-B), which is configured to move proximally and distally in the first portion 123 relative to movement of the slider 180, and through the second portion 128 to extend from and retract into the distal-most end of the second portion 128.

Referring now to FIGS. 5A-C, a bottom portion 122' of the housing 120 (FIG. 1) is described. Although various dimensions are shown for the illustrated bottom housing portion, indeed, it may be configured otherwise. FIG. 5A illustrates an interior plan view of the bottom housing portion 122'. FIG. 5B is a plan view of the bottom housing portion 122'. FIG. 5C is an exterior perspective view of the bottom housing portion 122'. As can be appreciated from FIGS. 5A-C, hereinafter collectively referred to as FIG. 5, the bottom housing portion 122' is configured to mate with the top housing portion 122 (FIG. 4) to define the housing 120, thereby sealing and protecting the internal components. As shown in FIG. 5, the bottom housing portion 122' is configured with ledges to support and hold the circuit board 130 (FIGS. 2A-B) and other internal components of the gauge 100.

As shown in FIG. 5, the bottom housing portion 122' may be formed with an ergonomic treatment to facilitate positive gripping of the gauge 100 and/or prevent or reduce fatigue of the user's hand during use of the gauge 100. As shown, the ergonomic treatment may be a plurality raised ridges 124'. The ergonomic treatment may be formed of a suitable (e.g., grip-enhancing, silicone-like, spongy, etc.) material such as a thermoplastic elastomer. As can be appreciated, the bottom housing portion 122' may be formed in two parts—a first part is a formed part having the raised ridges 124' and a contoured surface designed to mate with a bottom plastic portion, with the ridges 124' configured to protrude through holes in the second part that is attached, connected or otherwise coupled with the first part. In one example, the bottom housing portion 122' may be formed by injection molding process where the second part is overmolded onto the first part.

Turning now to FIG. 6A, the carriage 150 (FIGS. 2A-B) will be described in further detail. Although various aspects are shown for the illustrated carriage, indeed, it may be configured otherwise (e.g., relative to the housing portions 122, 122'). FIG. 6 is a perspective view of the carriage 150. As shown in FIG. 6, the carriage 150 includes a base portion 152 and a coupling portion 154 that extends or projects from a top surface of the base portion 152.

As is best shown in FIGS. 2A and 2B, the coupling portion 154 is configured to mate with the slider 180 for moving the conductive member 136 along the traces 134A, 134B on the bottom surface of the circuit board 130. To this end, the base portion 152 of the carriage 150 further includes projections 156 at the distal and proximal ends thereof for maintaining the curved or arced shape of the conductive member 136. As further shown in FIG. 6, the base portion 152 of the carriage 150 further includes an aperture 158 (e.g., a blind hole) into which the probe 200 (particularly the proximal end 220 of probe 200) is inserted and/or coupled. In some embodiments the probe 200 may be removable from the carriage 150 for various reasons including, but not limited to, facilitating cleaning/sterilization of the gauge 100.

Turning now to FIGS. 7A-B, the second seal 170 (FIGS. 2A-B) will be described in further detail. Although various aspects are shown for the illustrated second seal, indeed, it may be configured otherwise (e.g., relative to the configuration of the circuit board 130 and/or housing portions 122, 122'). FIG. 7A illustrates a top perspective view of the second seal 170, and FIG. 7B illustrates a bottom perspective view of the second seal 170. As shown in FIGS. 7A-B, hereinafter collectively referred to as FIG. 7, the second seal 170 includes a lengthwise-extending slit 172, and an aperture 174. As can be appreciated, the slit 172 is configured to be complementary with the elongated slot 132 of the circuit board 130. The slit 172 may function as a self-sealing closure that allows movement of the coupling portion 152 of the carriage 150, but prevents contaminants from contacting the circuit board 130 that is below the seal 170.

Furthermore, the aperture 174 is configured to accommodate the button 160 (FIGS. 1A and 2A) so that liquid or solid contaminants do not enter the housing 120 and contact the circuit board 130 when the user presses the button (e.g., to turn the gauge 100 on or off, or to hold or store a length/depth measurement).

Figure 8A:
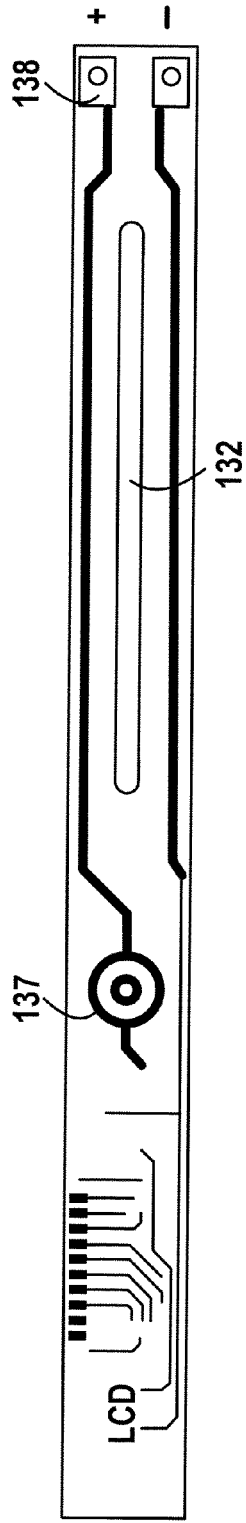
FIGS. 8A-B are top and bottom views of an exemplary printed circuit board of the electronic depth gauge of FIG. 1.
Figure 8B:
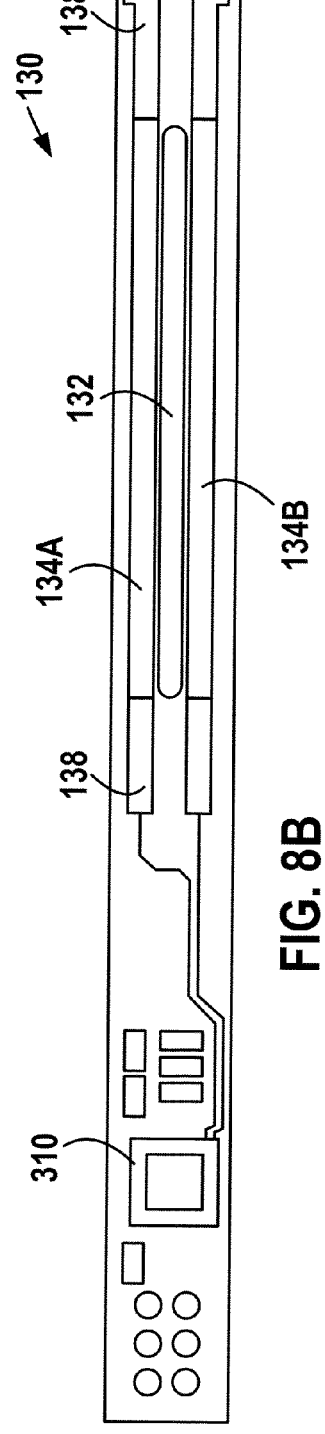

Turning now to FIGS. 8A-B, the circuit board 130 (FIGS. 2A-B) will be described in further detail. As shown in FIG. 8A, the top side or surface of the circuit board 130 includes various wires or traces for electrically connecting previously-described components including, for example the power source 190 (FIGS. 2A-B), the display 140, and the switch 160 (FIGS. 1A and 2A). A bullseye-shaped wiring trace 137 shown in FIG. 8A corresponds with the switch 160, and the traces at the proximal end (i.e., the right-hand side as shown in FIG. 8A) marked with "+" and "−" correspond with the power source 190. Slot 132 extends along a centerline of the board 130 longitudinally between the bullseye-shaped trace and the +/−traces. At a distal end (i.e., the left-hand side as shown in FIG. 8A), traces marked with "LCD" interface the display 140 (FIGS. 1A and 2A) with a controller or processor (shown in FIG. 8B and FIGS. 9A, B). As shown in FIG. 8B the bottom side or surface of the circuit board 130 includes various wires or traces for electrically connecting a controller or processor 138 with previously-described components including, for example, the linear potentiometer (defined by the semiconductive traces 134A, 134B and the conductive member 136), the power source 190 (FIGS. 2A-B), the display 140, and the switch 160 (FIGS. 1A and 2A).

Figure 9B:
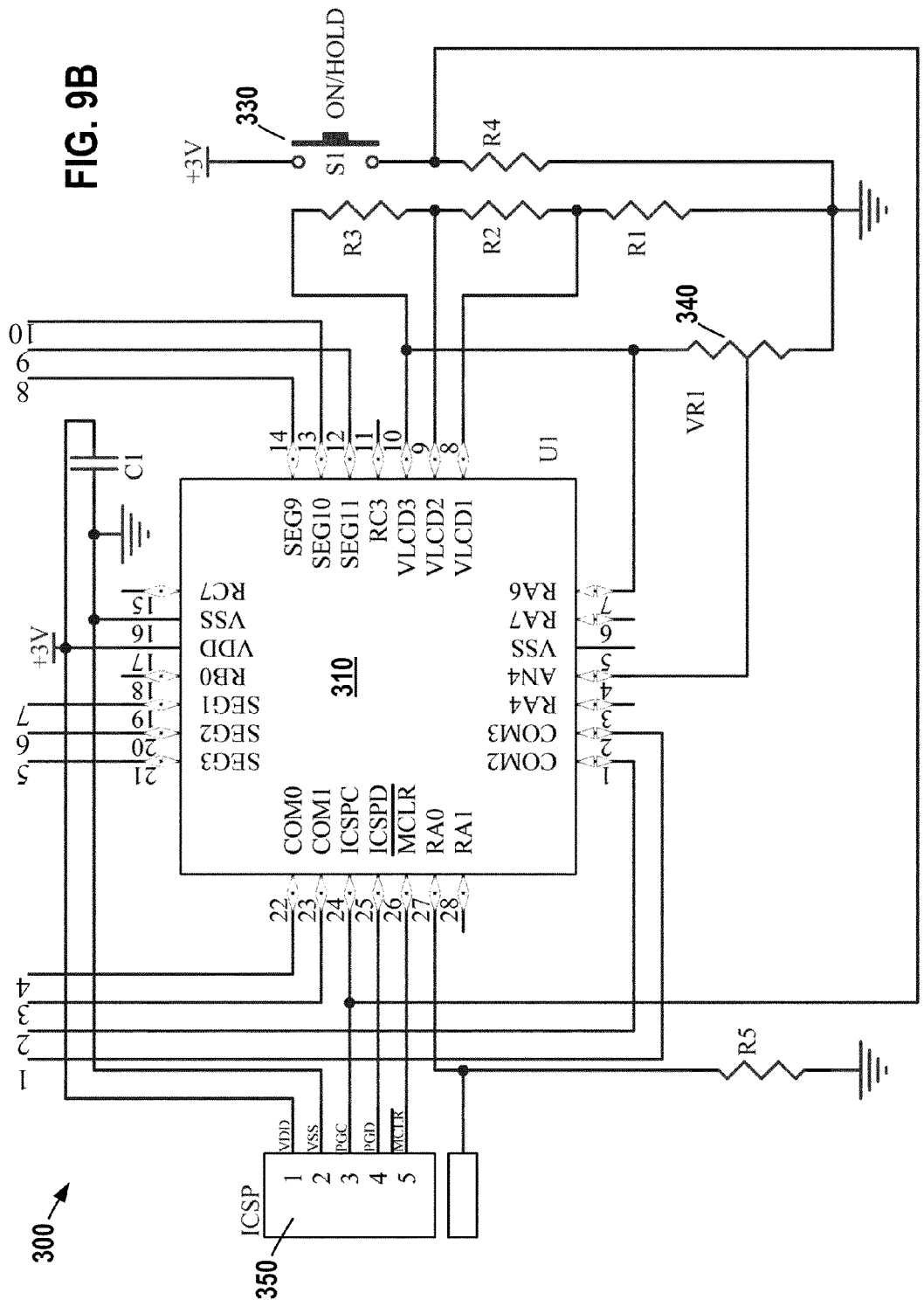

Turning now to FIGS. 9A, B (collectively, FIG. 9), an exemplary circuit schematic is described for the gauge 100. As shown in FIG. 9, the circuit 300 includes a controller or processor 310, such as that disclosed in document by Microchip® PIC16F913/914/916/917/946 Data Sheet: 28/40/44/64-Pin Flash-Based 8-Bit CMOS Microcontrollers with LCD Driver and nanoWatt Technology, 2007 (Document No. DS41250F), herein incorporated by reference (PIC16/F913 shown in FIG. 9), an LCD display screen 140, a switch 330, a variable resistor (e.g., 100KΩ (1%) surface mount device), and an optional in-circuit serial programming (ICSP) interface 350. The controller or processor 310 is in electrical communication with the display 140 for controlling or driving the display 140 to indicate a length or depth measurement relative to the variable resistor 340. The controller or processor 310 may be any suitable microprocessor, microcontroller, digital signal processor (DSP), field programmable gate array (FPGA), application specific integrated circuit (ASIC) or the like.

The display screen 140 as shown is an LCD panel for displaying three alphanumeric characters as well as the indicia "hold" and a unit of measurement (e.g., "mm" as shown). Although the illustrated LCD panel 140 is configured to show three alphanumeric characters, it may be configured otherwise to display fewer or additional characters or indicia. Furthermore, the display screen 140 may be other types of displays known in the art such as a light-emitting diode display and the like.

The switch 330 may be a microswitch, snap dome or the like that couples with button 160 (FIG. 1A) for turning the gauge 100 on and off. Furthermore, the controller 310 may include a timer and be programmed with a power save mode—that is instructions for turning off the gauge 100 after a predetermined amount of time. Additionally, the switch 330 when pressed and held for a predetermined period of time may signal the controller 310 to freeze the display 140 and/or to store the measurement displayed thereon to a memory for recall at a later time. In some embodiments, the user may actuate the switch 330 to change units of measurement (e.g., English to metric and vice versa). Although the variable resistor 340 may be defined by the semiconductive traces 134A, 134B and conductive member 136 (best illustrated in FIG. 2b), it should be appreciated that other types of linear potentiometers, which relate electrical resistance and linear displacement, may be employed in the present electronic depth gauge. Furthermore, a rotary potentiometer could also be used if a mechanism is provided for converting linear motion to rotary motion. Such a mechanism could include, e.g., one or more circular and linear gears in combination.

The software modules used in the controller may be stored as program instructions or computer readable codes executable on the processor on a computer-readable media such as read-only memory (ROM), random-access memory (RAM), CD-ROMs, magnetic tapes, floppy disks, and optical data storage devices. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

TABLE OF REFERENCE CHARACTERS 100 electronic depth gage
110 first seal
120 generally elongated housing
120P housing proximal end
120D housing distal end
121 first chamber of first portion
122 top housing part
122' bottom housing part
123 first portion of top housing part
123' bottom housing
124 first aperture of first portion
124' grip portion
125 graduated scale
126 second aperture of first portion
127 third aperture of first portion
128 second portion of top housing part
129 second chamber of first portion
130 circuit board
132 Slot
134A, B semiconductive traces
136 conductive member
137 button contact conducting member/bullseye wiring trace
138 conductive traces
140 electronic display
150 Carriage
152 carriage base portion
154 carriage coupling portion
158 carriage aperture
160 on/off/measurement-hold button
170 second seal
180,180' Slider
190 power source 200 Probe
210 central portion of probe
220 proximal portion of probe
230 distal portion of probe
240 engagement surface, probe tip
300 Circuit
310 controller/processor
320 Display
330 Switch
340 variable resistor (possibly implemented as 134A, 134B, 1
350 programming interface

What is claimed is:

1. A digital depth gauge apparatus for measuring a depth of a hole in, or surface of, an object, the apparatus comprising:
   an elongated reader body that includes a distal end and a proximal end having a longitudinal axis;
   a user interface including a display and at least one actuator that controls operation of at least one of the display and the apparatus;
   a probe that extends from the distal end of the reader body, the probe including a tip for locating a distal surface of the object;
   the reader body proximal end configured to abut an other surface of the object; and
   an electrical resistance-based sensor fixedly positioned relative to at least one of: a) the reader body, and b) the probe, and movably positioned relative to, respectively, at least one of: b) the probe, and a) the reader body, the sensor comprising an interface to the user interface display and having an output indicating a relative distance between the probe tip and the proximal end of the reader body.

2. The apparatus of claim 1, further comprising:
   a slider element that is one of actuators, the slider element being attached to the probe and movable in a direction parallel to the longitudinal axis of the body;
   wherein the sensor comprises a linear variable resistor element and a conducting element that contacts the linear variable resistor element at some point along its length, the slider element being fixedly attached to at least one of the conducting element and the linear variable resistor element to effect relevant motion between the two as the slider is moved;
   the apparatus further comprising:
   a power source attached across the variable resistor element at a fixed voltage or current; and
   circuitry to measure voltage or current within the variable resistor element that is related to a position of the conducting element along the linear variable resistor element; and
   circuitry to convert and display the variable resistor element voltage or current as a distance related to a distance between the probe tip and the proximal end of the reader body.

3. The apparatus of claim 2, wherein the variable resistor element comprises two parallel resistive strips arranged on the circuit board.

4. The apparatus of claim 3, wherein the slider element comprises:
   a base portion; and
   a coupling portion, the coupling portion holding the conducting element so that the conducting element creates an electrical contact between the two parallel resistive strips at a particular location.

5. The apparatus of claim 4, wherein the coupling portion protrudes through a slit on the printed circuit board.

6. The apparatus of claim 3, wherein the resistive strips comprise a series of discrete bands, each having a predetermined resistance.

7. The apparatus of claim 1, wherein the body is a sealed body.

8. The apparatus of claim 7, wherein the sealed body comprises:
   a first seal that is located at the proximal end of the body and seals a location of the body through which the probe extends; and
   a second seal that is located along a slider opening and seals a location of the body through which the slider extends.

9. The apparatus of claim 8, wherein:
   the first seal is a generally disk-shaped seal, and
   the second seal is a seal extending longitudinally along the body between the body case and the printed circuit board, and comprises a slit through which a portion of the slider extends.

10. The apparatus of claim 8, wherein the seals are comprised of a biocompatible rubber polymer.

11. The apparatus of claim 1, wherein the apparatus is holdable and operable with a single hand.

12. The apparatus of claim 11, wherein the total length of the body is between 150 mm and 250 mm.

13. The apparatus of claim 11, further comprising an ergonomic treatment located on an exterior surface of the body.

14. The apparatus of claim 13, wherein the ergonomic treatment is formed from a thermoplastic elastomer.

15. The apparatus of claim 1, wherein the apparatus is self-contained and comprises its own power source.

16. The apparatus of claim 1, wherein the electrical resistance-based sensor comprises at least one semiconductor strip printed on a printed circuit board that is mounted with the body.

17. The apparatus of claim 16, wherein the semiconductor strip comprises carbon or a cargon compound.

* * * * *